J. W. FOARD,

Assignor, by mesne assignments, to W. W. WILSON.

Shoemaker's Float.

No. 9,396. Reissued Oct. 5, 1880.

*Witnesses.*
J. Campbell
A. Herbert

*Inventor*
*Jeremiah W. Foard*
*per. R. T. Campbell*
*Attorney.*

N. PETERS, PHOTO-LITHOGRAPHER, WASHINGTON, D. C.

UNITED STATES PATENT OFFICE.

JEREMIAH W. FOARD, OF SAN FRANCISCO, CAL., ASSIGNOR, BY MESNE ASSIGNMENTS, TO WM. W. WILSON, OF BOSTON, MASS.

SHOE-MAKER'S FLOAT.

SPECIFICATION forming part of Reissued Letters Patent No. 9,396, dated October 5, 1880.

Original No. 48,544, dated July 4, 1865. Application for reissue filed August 12, 1880.

*To all whom it may concern:*

Be it known that I, JEREMIAH W. FOARD, of the city and county of San Francisco, in the State of California, have invented a new and useful Shoe-Maker's Peg-Float, of which the following is a specification.

Figure 1:
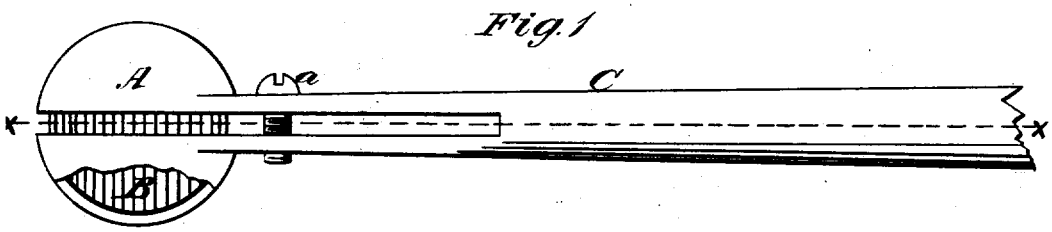
Figure 2:
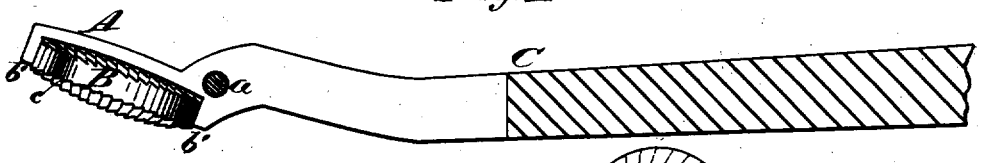
Figure 7:
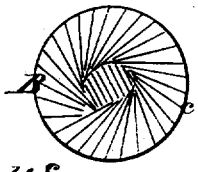
Figure 6:
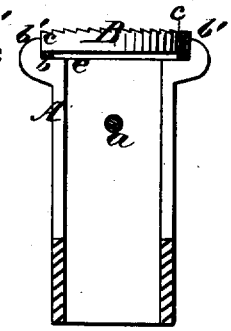
Figure 3:
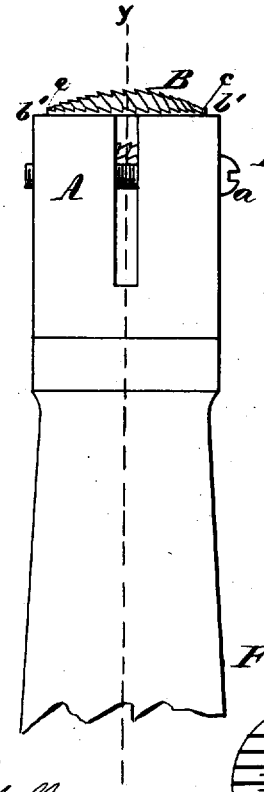
Figure 4:
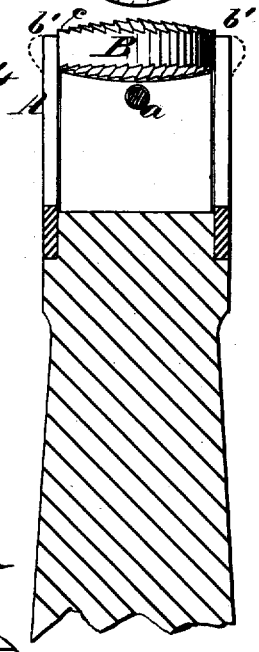
Figure 5:
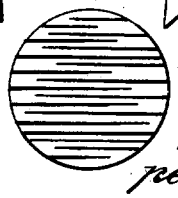

In the annexed drawings, Figures 1 and 2 show my guarded or shielded cutter applied in a socket formed on the end of an angular arm or holder, for the purpose of removing pegs and nails from the forward parts of boots and shoes. Figs. 3, 4, and 6 show the cutters applied on the upper ends of straight holders or stocks. Figs. 5 and 7 are face views of cutters detached from their sockets.

Similar letters refer to similar parts throughout the several views.

A, Figs. 1, 2, 3, 4, and 6, designates a socket of circular form, which is adapted to receive inside of it a circular cutter, B. The socket A of Figs. 1 and 2 is quite shallow, and it is on the end of an arm or holder, C, which is bent at an obtuse angle with respect to the plane of the cutting-face of the cutter B, so that the latter can be conveniently used for removing pegs and nails from the forward parts of boots and shoes. The sockets A of Figs. 3, 4, and 6 are on the ends of holders the longitudinal axes of which coincide with the axes of their respective cutters B. This arrangement is designed for removing the ends of pegs and nails from the rear or heel parts of boots and shoes.

The cutters B of Figs. 1, 2, 3, 4, 5, and 7 have convex cutting-surfaces adapted for the purpose stated, and each one of said cutters has two cutting-faces, so that when one face is dulled the cutter can be reversed in its socket and a sharp cutting-face presented.

The cutter B of Fig. 6 has but one cutting-face, and is not reversible. This last-named cutter is supported by means of a washer, *b*, of suitable thickness upon a shoulder, *e*, formed in the upper end of the hollow holder or socket A.

The drawings represent the sockets A slitted diametrically and provided with screws *a*. By these means the cutters can be held in their sockets and removed therefrom at pleasure.

It will be seen that when a cutter, B, is seated in its socket A the upper edge of the latter forms a guard or shield, *b'*, which may be rounded or not, and which will prevent the peripheral cutting-edges (at *c*) of the cutter B from being brought in contact with the uppers of boots and shoes during the operation of removing the ends of pegs and nails from the insoles.

The guard or shield *b'* allows the float to be used rapidly or slowly without any liability of cutting, scraping, or in any manner injuring the boots or shoes, and while this is the case the guards or shields will allow the operator to finish his work smoothly.

The serrations which form the cutting-faces of the cutters may be arranged as shown in Figs. 5 and 7, or in any other suitable manner.

What I claim as my invention is—

1. A socket, A, formed on the end of a holder and provided with a seat or shoulder, and with a guard or shield, *b'*, in combination with a cutter, substantially in the manner and for the purpose set forth.

2. In a shoe-maker's peg cutter or float, a circular cutter, B, seated in a socket provided with the guard or shield *b'*, substantially as described.

3. In a shoe-maker's peg cutter or float, the guard or shield *b'* on the end of a socket, A, in combination with a circular cutter which is removably applied inside of said socket and guard or shield, for the purpose of preventing injury to the uppers of boots and shoes while cleaning out the ends of pegs and nails, as specified.

JEREMIAH W. FOARD.

Witnesses:

JOHN H. REDSTONE,

OTIS V. SAWYER.